No. 893,832. PATENTED JULY 21, 1908.
H. B. BARUCH.
TIRE.
APPLICATION FILED APR. 24, 1907.
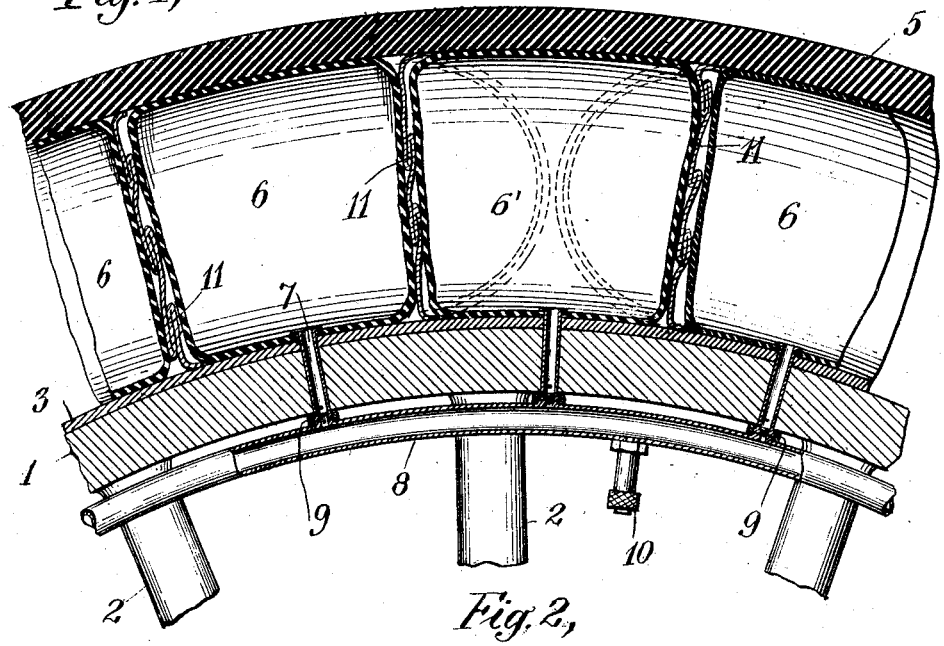
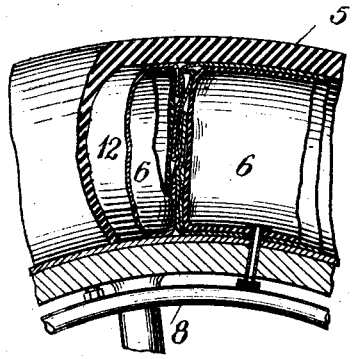
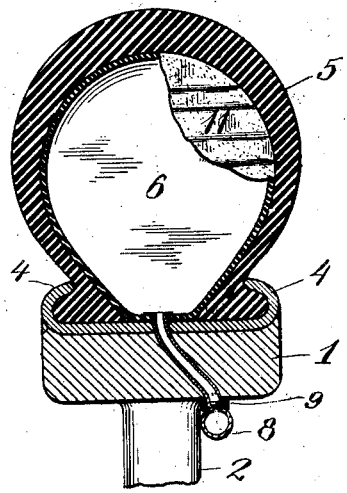
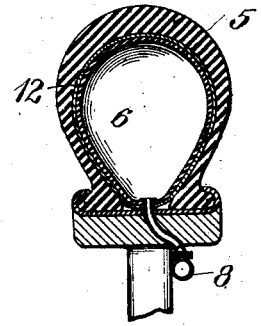
WITNESSES:
INVENTOR
Herman B. Baruch,
BY
ATTORNEY

UNITED STATES PATENT OFFICE.

HERMAN B. BARUCH, OF NEW YORK, N. Y.

TIRE.

No. 893,832.  Specification of Letters Patent.  Patented July 21, 1908.

Application filed April 24, 1907. Serial No. 369,904.

*To all whom it may concern:*

Be it known that I, HERMAN B. BARUCH, a citizen of the United States, residing in the borough of Manhattan, in the city, county, and State of New York, have invented a certain new and useful Improvement in Tires, of which the following is a specification.

This invention relates to resilient tires adapted particularly for use on the wheels of self-propelled vehicles.

The invention is directed to the provision of an improved form of tire possessing the strength and resiliency of those now in common use and having an inner tube consisting of a plurality of expansible tube-sections so arranged that the collapsing of one or more of the sections does not render the tire useless.

In accordance with the invention, the outer tube or shoe may be similar to those now generally used, but the inner tube consists of a plurality of individual tube-sections each of which is expansible, bulbs of thin rubber being preferably employed for this purpose. A connection to each bulb for admitting and exhausting air to inflate or deflate the tire is preferably provided and these may all be connected to a common source of supply, so that all of the tube-sections may be simultaneously inflated; in this case suitable valves are arranged for disconnecting the sections one from another, so that should one of them become punctured, the air will not be exhausted from another or others therethrough. With such an inner tube of expansible sections is combined a means for precluding more than a predetermined amount of expansion of a section. Thus, if one or more sections were punctured, the two sections adjacent thereto would expand to fill or partially fill the space formerly occupied by the collapsed section; and if no means were provided for limiting the amount of expansion of the sections and this space to be filled were unusually large, due to the size of the sections or the number of collapsed sections, the sections adjacent to the space to be filled would expand so much that they, too, would collapse and so on until the tire would be rendered unsuitable for use. Also, if the puncture of a section were caused by a nail entering through the shoe and section and this nail were to remain in place, the expansion of the adjacent sections, if no limiting means were provided, would carry them into engagement with the nail and they, too, would be punctured. When only a prede- termined amount of expansion is permitted, not more than one section could expand sufficiently to come in contact with the nail, and the tire could still be used.

The means for limiting the expansion of the tube-sections may be constructed in various ways. Preferably it consists of light, flexible fabric extending between adjacent tube-sections and buckled more or less when the sections are intact. A plurality of sheets of such a fabric may be employed, each secured at its edges to the interior of the shoe and forming a partition between adjacent tube-sections. Or the fabric may be in the form of a bag inclosing or partially inclosing a tube-section, in which case it need not be permanently connected to the interior of the shoe.

The preferred embodiment of my invention is illustrated in the accompanying drawings, in which Figure 1 is a longitudinal section of a portion of the tire; Fig. 2 is a transverse section of the same; and Figs. 4 and 3 are similar views of a modified form of tire.

Referring to these drawings, 1 indicates the felly of a wheel supported on spokes 2 and having a metallic rim 3 encircling and secured upon the felly, this rim being provided with flanges 4 at its edges, adapted to coact with flanges formed on the lateral edges of the outer tube or shoe 5 to hold the latter in place. The shoe 5 may be of any suitable construction.

The inner tube consists of a plurality of expansible tube-sections 6 arranged end to end within the shoe 5. A bulb or ball of thin rubber or other suitable material may be employed for each of the sections 6. A tube 7 is sealed into each section 6 for admitting or exhausting air, in order to inflate or deflate the tire. The sections 6 are preferably simultaneously inflated; for this purpose, a tube 8 is provided, to which all of the tubes 7 are connected, a valve 9 being preferably provided in each of these connections so that the several sections may be disconnected one from another when properly inflated. The tube 8 is provided with a suitable valve 10, arranged for connection with an airpump or a source of supply of compressed air.

Between each pair of adjacent tube-sections 6, extends a sheet of flexible fabric, which, when the two sections are inflated, is buckled more or less. As shown in Figs.

1 and 2, this sheet of fabric 11 is secured at its edges to the interior of the shoe 5, as by means of cement, or it may be formed integral with the fabric of the shoe, so that it forms a partition between the two tube-sections, permanently connected to the shoe and adapted to be bulged out to one side or the other to permit expansion of one of the tube-sections but preclude more than a predetermined amount of expansion. Thus, if the section indicated by the numeral 6' in Fig. 1 were to collapse, the two sections adjacent thereto would expand and bulge out the two partitions 11 between them toward each other, so that the parts would then occupy the positions indicated by the dotted lines in that figure. The two sections 6 thus expanded would press the tread of shoe 5 outwardly from the rim, so that the tire could still be used, and also there would be no danger of the sections 6 expanding to so great an extent that they too would collapse. If the section 6' were to be punctured by a nail passing through the shoe and section and this nail were to remain in place, the partitions 11 might prevent the sections 6, 6, adjacent to the collapsed section, from expanding so much as to come in contact with this nail and be punctured thereby; in any case, however, not more than one section adjacent to the collapsed section could expand enough to be punctured by the nail, and the two sections adjacent to the space formerly occupied by these two punctured sections would expand and fill so much of the space as to permit further use of the tire without stopping for repairs.

In Figs. 3 and 4, I have shown a slight modification of the embodiment of my invention above described, with respect to the construction of the expansion-limiting means. Instead of employing partitions 11, which are permanently secured to the interior of the shoe, casings 12 are provided, partially or entirely inclosing each of the tube-sections, these casings being made of flexible fabric. Each of these casings is buckled more or less within the shoe 5 when all of the tube-sections 6 are intact, and is of such size as to permit the tube-section inclosed thereby to expand as much as is desired and preclude any further expansion. This form of my invention possesses all of the advantages above set forth in connection with the form illustrated in Figs. 1 and 2, and the further advantage that the expansion-limiting means is not secured to the shoe.

I do not wish to be understood as limited to the exact construction which I have herein shown and described, as other modifications can be made therein without departing from the spirit of my invention, and all such modifications I aim to cover by the terms of the appended claims.

Having now described my invention, what I claim as new therein and desire to secure by Letters Patent is as follows:—

1. A tire having an outer tube or shoe, an inner tube comprising a plurality of expansible tube-sections, and flexible parts within said shoe extending between said sections and being loose under normal conditions, said parts permitting said sections to expand to fill space adjacent thereto formerly occupied by a section which has collapsed but precluding more than a predetermined amount of expansion of said sections, substantially as set forth.

2. A tire having an outer tube or shoe, an inner tube comprising a plurality of expansible, inflatable tube-sections, and a flexible casing extending about each of said sections, said casing being loose under normal conditions and serving to preclude more than a predetermined amount of expansion of a section to fill space adjacent thereto formerly occupied by a section which has been punctured, substantially as set forth.

This specification signed and witnessed this 19th day of April, 1907.

HERMAN B. BARUCH.

Witnesses:
ARTHUR HOFHEIMER,
D. S. EDMONDS.